United States Patent
Armstrong

(10) Patent No.: US 7,338,082 B2
(45) Date of Patent: Mar. 4, 2008

(54) METHOD AND APPARATUS FOR SEATBELT ACCESS

(76) Inventor: Richard Armstrong, 449 Norris Landing Rd., Swansboro, NC (US) 28584

( * ) Notice: Subject to any disclaimer, the term of this patent is extended or adjusted under 35 U.S.C. 154(b) by 122 days.

(21) Appl. No.: 11/205,349

(22) Filed: Aug. 17, 2005

(65) Prior Publication Data

US 2007/0040371 A1    Feb. 22, 2007

(51) Int. Cl.
B60R 22/03    (2006.01)

(52) U.S. Cl. .................... 280/801.1; 280/804
(58) Field of Classification Search ............ 280/801.1, 280/804; 297/481, 468; B60R 22/03
See application file for complete search history.

(56) References Cited

U.S. PATENT DOCUMENTS

| | | | | |
|---|---|---|---|---|
| 3,842,929 A * | 10/1974 | Wada et al. | ................. | 280/804 |
| 4,236,730 A | 12/1980 | Suzuki et al. | | |
| 4,679,821 A * | 7/1987 | Yamamoto et al. | ......... | 280/808 |
| 4,775,167 A * | 10/1988 | Schiller et al. | ............. | 280/808 |
| 5,431,446 A * | 7/1995 | Czarnecki et al. | .......... | 280/802 |
| 5,746,448 A | 5/1998 | Apfel | | |
| 6,308,986 B1 * | 10/2001 | Townsend et al. | .......... | 280/807 |
| 6,634,064 B2 * | 10/2003 | Finotti | ......................... | 24/198 |

FOREIGN PATENT DOCUMENTS

| | | | |
|---|---|---|---|
| DE | 199 01 276 A1 | * | 7/2000 |
| DE | 100 55 844 A1 | * | 8/2004 |
| DE | 103 14 464 A1 | * | 10/2004 |
| GB | 2 171 892 A | * | 9/1986 |
| GB | 2 401 839 A | * | 11/2004 |
| JP | 59-118550 A | * | 7/1984 |

* cited by examiner

Primary Examiner—Ruth Ilan
(74) Attorney, Agent, or Firm—Bell, Boyd & Lloyd LLP

(57) ABSTRACT

A seatbelt access method and system are provided. A seatbelt access system can include a seatbelt and a seatbelt slide, wherein the seatbelt slide substantially encloses a portion of the seatbelt. The seatbelt access system can also include a seatbelt slide positioning system operable to move the seatbelt slide forward. A seatbelt slide positioning system can include a pull cord, and the pull cord can be operably coupled to the seatbelt slide. The pull cord can also be operably coupled to a vehicle frame. Alternatively, the pull cord can be operably coupled to an electronic motor or an electrically powered track. Alternatively, a seatbelt slide positioning system can include a bar. A seatbelt slide positioning system can also include a retractor. Further, a seatbelt slide positioning system can include a motor operable to move the seatbelt slide substantially forward and an activation device operable to activate the motor.

8 Claims, 9 Drawing Sheets

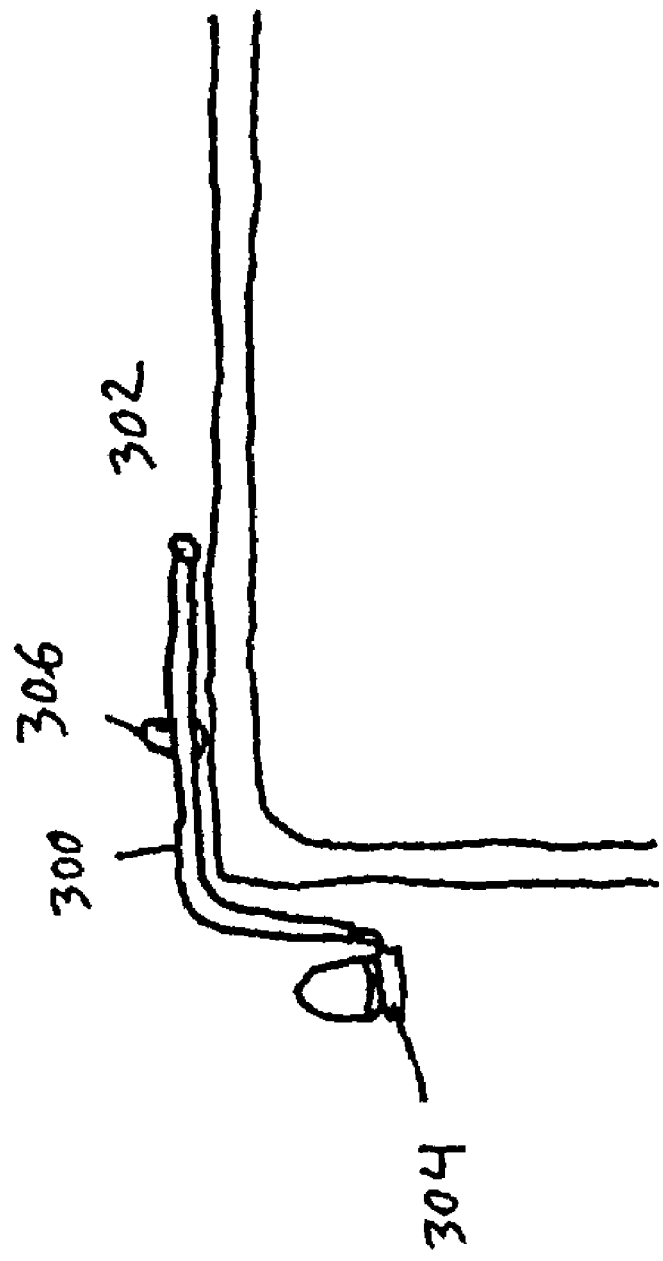

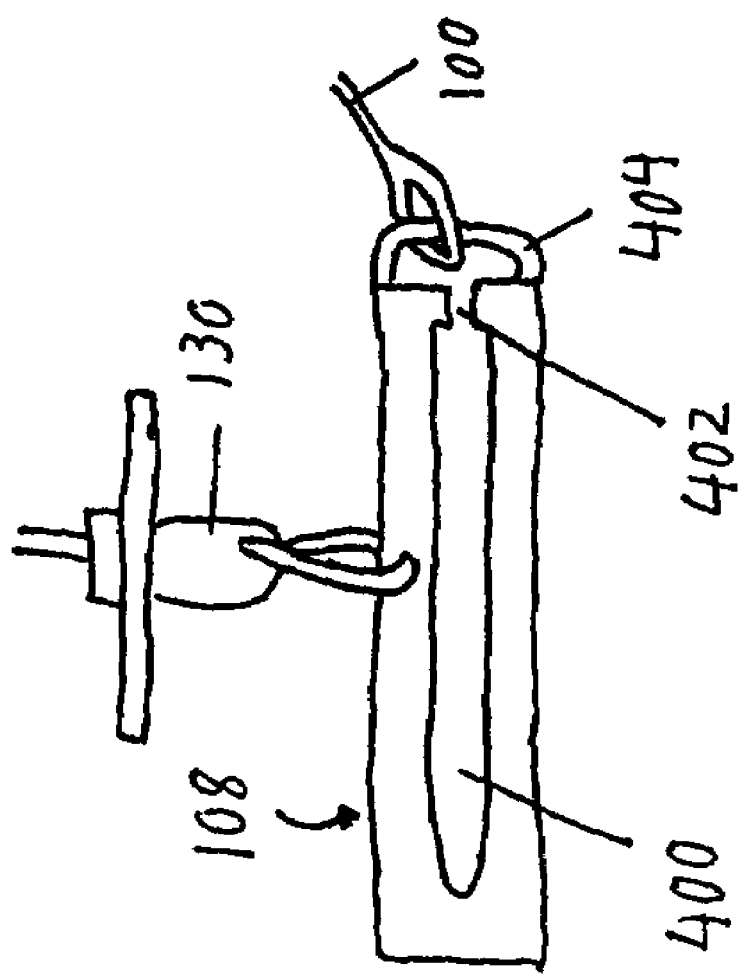

METHOD AND APPARATUS FOR SEATBELT ACCESS

BACKGROUND

Seatbelt usage saves lives and is mandated in many jurisdictions. However, for various reasons, some drivers and passengers fail to buckle up. One reason for this life threatening failure is that the seat belt is inconveniently positioned. Typically, seat belts are retracted to a position in line with the post or door jam to the rear of the front door. It can be difficult for some drivers and passengers (e.g., shorter drivers who require the seat to be more forward, the elderly and others with restricted motion) to reach back or twist around to grasp the seat belt after they are seated.

U.S. Pat. No. 4,236,730, entitled "Seatbelt system" issued to Suzuki, et al., hereby incorporated by reference, discloses a seatbelt system in which part of the seatbelt, the strap that restrains the upper body, is automatically placed in position to restrain the driver. One end of the strap moves along a guide rail generally positioned along the door frame, and the other end is attached to a fixed location between the driver and the passenger. To allow the driver it enter and exit the car, the strap moves forward on the guide rail. When the driver is seated and ready to drive the car, the strap moves rearward on the guide rail to position the strap across the driver's torso. However, the strap for the driver's waist must still be manually grasped and buckled. Thus, the problem of reaching back or twisting is not fully addressed.

U.S. Pat. No. 5,746,448, entitled "Seat belt holder" issued to Apfel, hereby incorporated by reference, disclosed a device for holding the seat belt at a location on the seat such that the belt is still flexible enough to not interfere with entering or exiting the car. Thus, the belt is releasably held more forward than the seatbelt would otherwise be, making the belt less difficult to grasp. However, the belt must be placed in the holder after each use for the holder to be effective. Such a requirement is unlikely to be met each time and is, therefore, undesirable.

SUMMARY

A seatbelt access method and system are provided. A seatbelt access system can include a seatbelt and a seatbelt slide, wherein the seatbelt slide substantially encloses a portion of the seatbelt. The seatbelt access system can also include a seatbelt slide positioning system operable to move the seatbelt slide forward. A seatbelt slide positioning system can include a pull cord, and the pull cord can be operably coupled to the seatbelt slide. The pull cord can also be operably coupled to a vehicle frame. Alternatively, the pull cord can be operably coupled to an electronic motor or an electrically powered track.

Alternatively, a seatbelt slide positioning system can include a bar. The bar can be operably coupled to the seatbelt slide. The bar can also be operably coupled to a vehicle frame.

A seatbelt slide positioning system can also include a retractor configured to restore the seatbelt and seatbelt slide to its original position. Further, a seatbelt slide positioning system can include a motor operable to move the seatbelt slide substantially forward and an activation device operable to activate the motor. The activation device can be selected from the group consisting of a button, a switch, a dial, a slide, a voice recognition device, an audio device and a video device. The motor can also be operable to allow the seatbelt slide to move substantially rearward to its original position.

Additional features and advantages of the present invention are described in, and will be apparent from, the following Detailed Description of the Invention and the figures.

BRIEF DESCRIPTION OF THE FIGURES

FIG. 3 is a diagram of a seatbelt access system having a rigid bar in accordance with one embodiment of the present invention.

FIG. 4A is a diagram of the seatbelt slide of FIG. 1.

DETAILED DESCRIPTION

As illustrated by FIGS. 1-8, a method and apparatus for seatbelt access are provided. Embodiments of the present invention make seatbelts more convenient to use by increasing accessibility. Preferably, a pull cord 100 is provided. When the pull cord 100 is activated (e.g., by gripping and pulling the pull cord 100), the seat belt is moved to a more easily grasped position. Preferably, the pull cord 100 can be activated automatically or by use of a button or switch; however, the pull cord 100 can be activated by hand or any other suitable mechanism.

Figure 1:
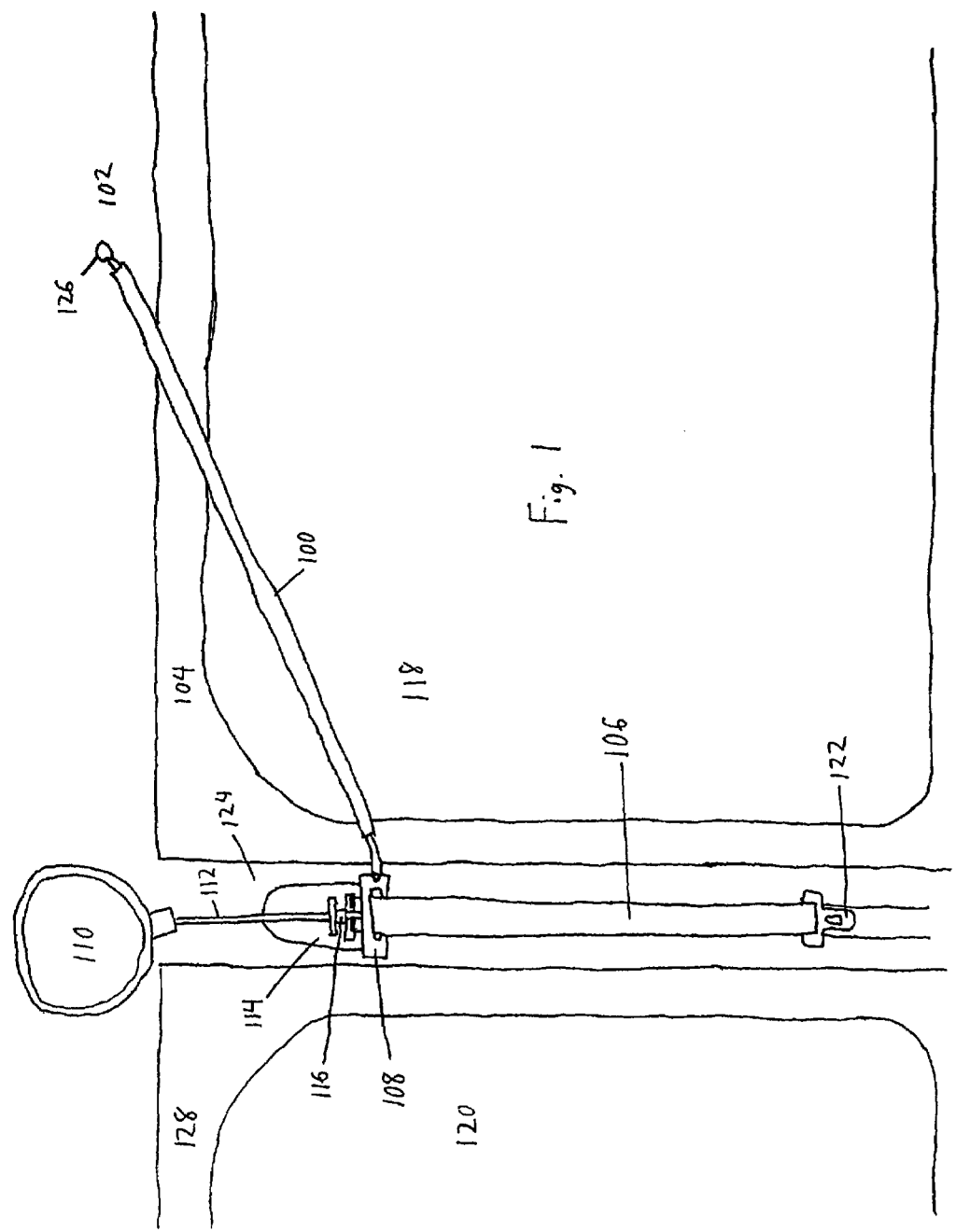
FIG. 1 is a diagram of a seatbelt access system in accordance with one embodiment of the present invention.
Figure 7:
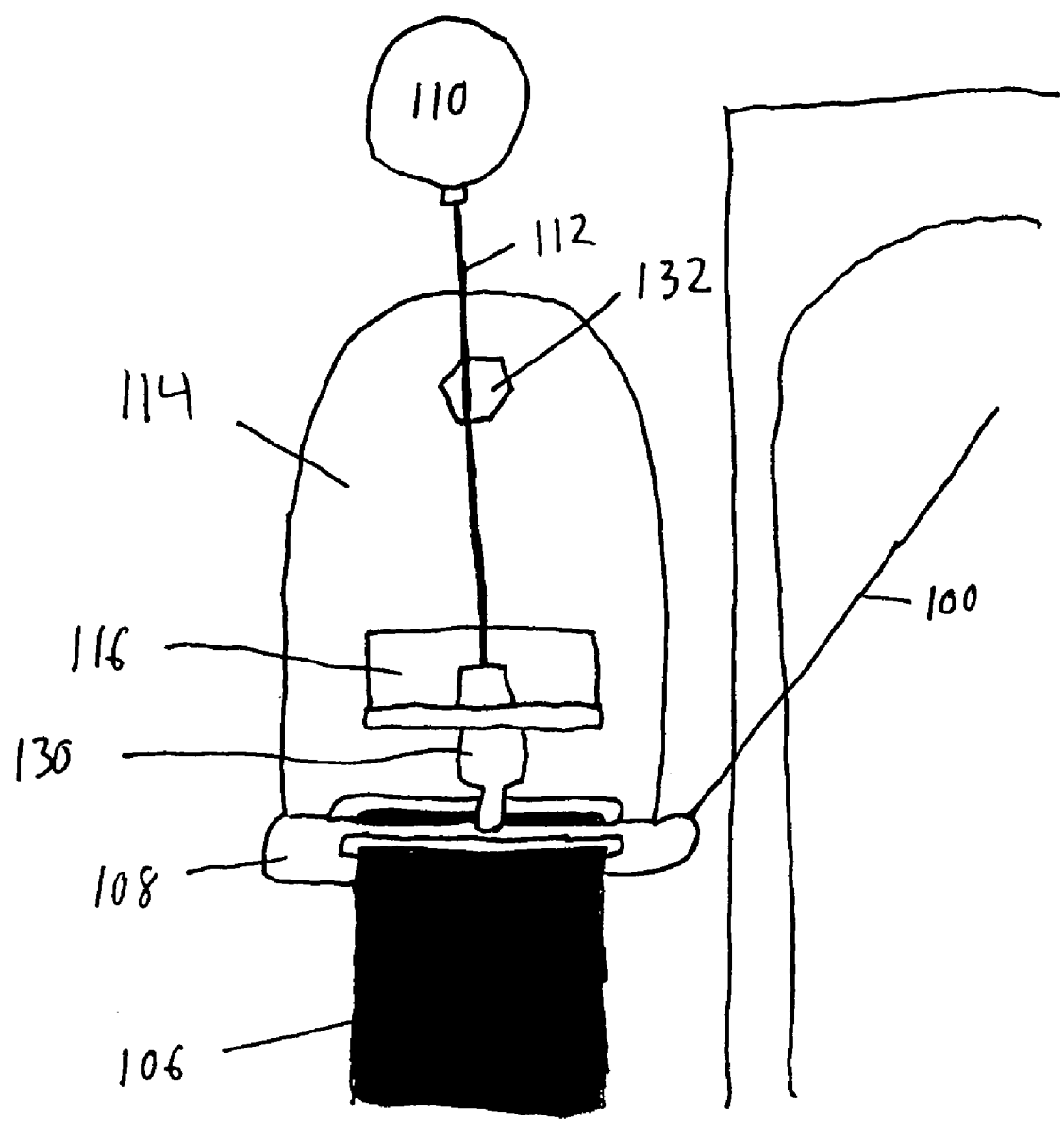
FIG. 7 is a diagram of the upper torso and seatbelt guide of FIG. 1.
Figure 8:
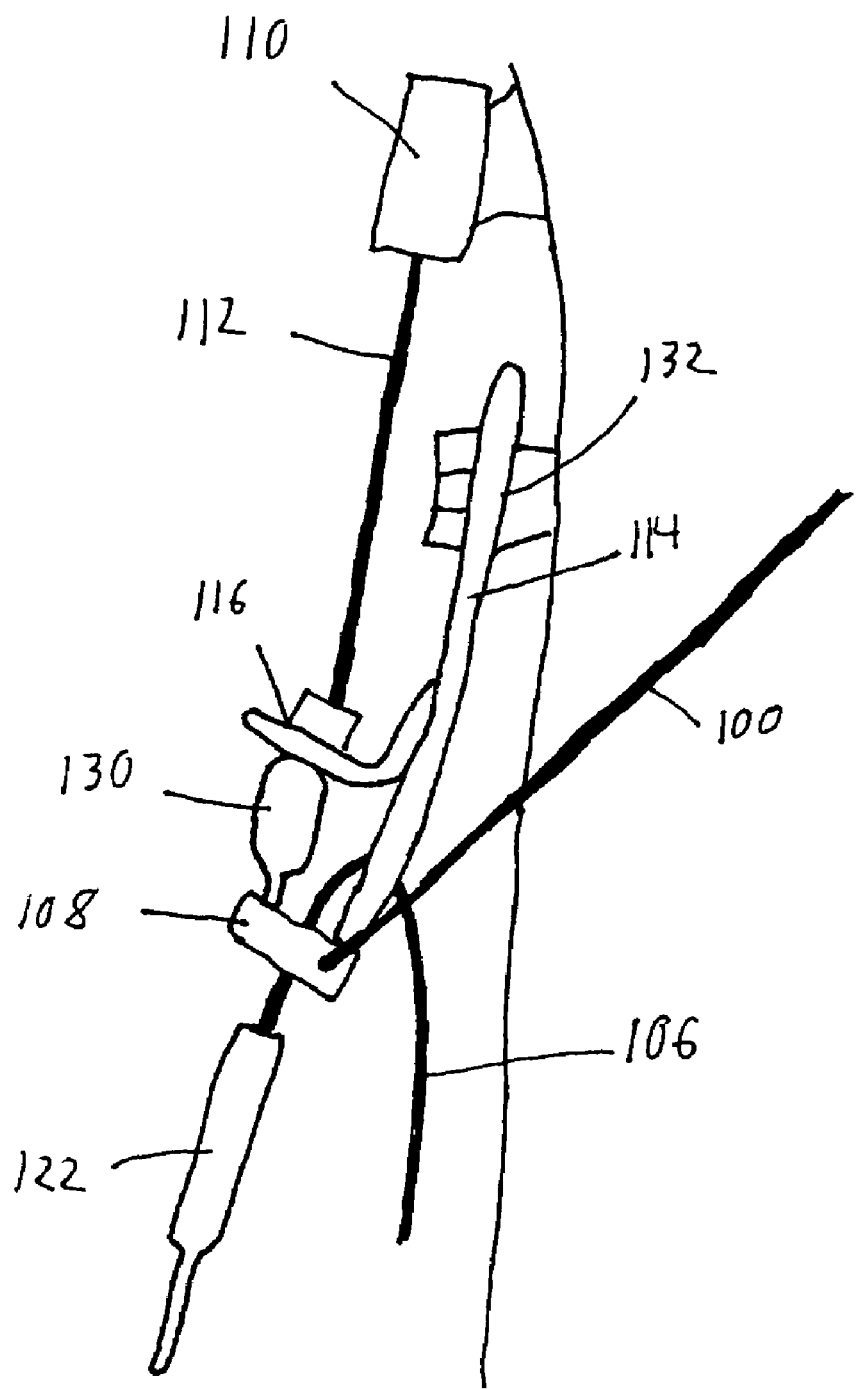
FIG. 8 is a diagram of a side view of the upper torso and seatbelt guide of FIG. 1.

As shown in FIGS. 1, 7 and 8, one end of the pull cord 100 is preferably attached to the frame 102 by a universal joint 126 above the front door 104; however, the end can be attached, coupled or otherwise connected to any suitable location and by any suitable device. Further, the pull cord 100 can be attached to an electrically powered reel (e.g., within the frame 102) that can activate the pull cord 100 automatically or upon activation of a switch, button, voice recognition device, audio device, video device or any other suitable device. Such a reel can also deactivate the pull cord 100 (e.g., by unreeling the pull cord 100) automatically or upon activation or deactivation of a switch, button, voice recognition device, audio device, video device or any other suitable device.

The other end of the pull cord 100 is preferably coupled to the seatbelt 106 by a seatbelt slide 108; however, the end can be attached, coupled or otherwise connected to the seatbelt 106 directly or by any suitable device. As a result, when the pull cord 100 is activated, a portion of the seatbelt 106, including the seatbelt slide 108, is pulled approximately perpendicular to the post 124 and in a plane approximately parallel to the plane of the window 118. The seatbelt slide 108 traps the seatbelt 106, so the necessary length of seatbelt 106 is extracted from the seatbelt retractor.

Preferably, the forward motion of the seatbelt 106 activates a retractor 110. The pull cord retractor 110 is preferably fixed to the upper torso anchor 114 and moves with the anchor 114, pivoting about upper torso anchor pivot 132 as it changes angle to adjust the direction of the seatbelt; however, the retractor 110 can be fixed to any suitable location. The retractor 110 includes a retractor cord 112 that passes through a retractor cord guide 116 fixed to the seatbelt post anchor 114. Retractor cord stop 130 stops retraction of the retractor cord 112 when retractor cord stop 130, pivotally attached to seatbelt slide 108, meets the retractor cord guide 116. Preferably, the seatbelt post anchor 114 is positioned on the post 124 between the front door 104 and a back door 128; however, the seatbelt post anchor 114 can be positioned in any suitable location. The seatbelt post anchor 114 is illustrated as being located substantially near the top of the front door window 118 and/or the rear door window 120; however, the seatbelt post anchor can be located at any suitable sight.

Preferably, the retractor cord 112 coils within the retractor 110 such that additional retractor cord 112 is fed out of the retractor 110 as the seatbelt slide is pulled forward by the pull cord.

Once the driver or passenger grasps the seatbelt 106, the pull cord 100 can be deactivated (e.g., released), causing the retractor 110 to retract the retractor cord 112. As a result, the seatbelt slide 108 returns to its resting position adjacent to the seatbelt post anchor 114. As the seatbelt slide 108 returns to the seatbelt post anchor 114, slot in the seatbelt slide 108 is aligned with the slot of the seatbelt post anchor 114, allowing normal operation of the seat belt.

Figure 2:
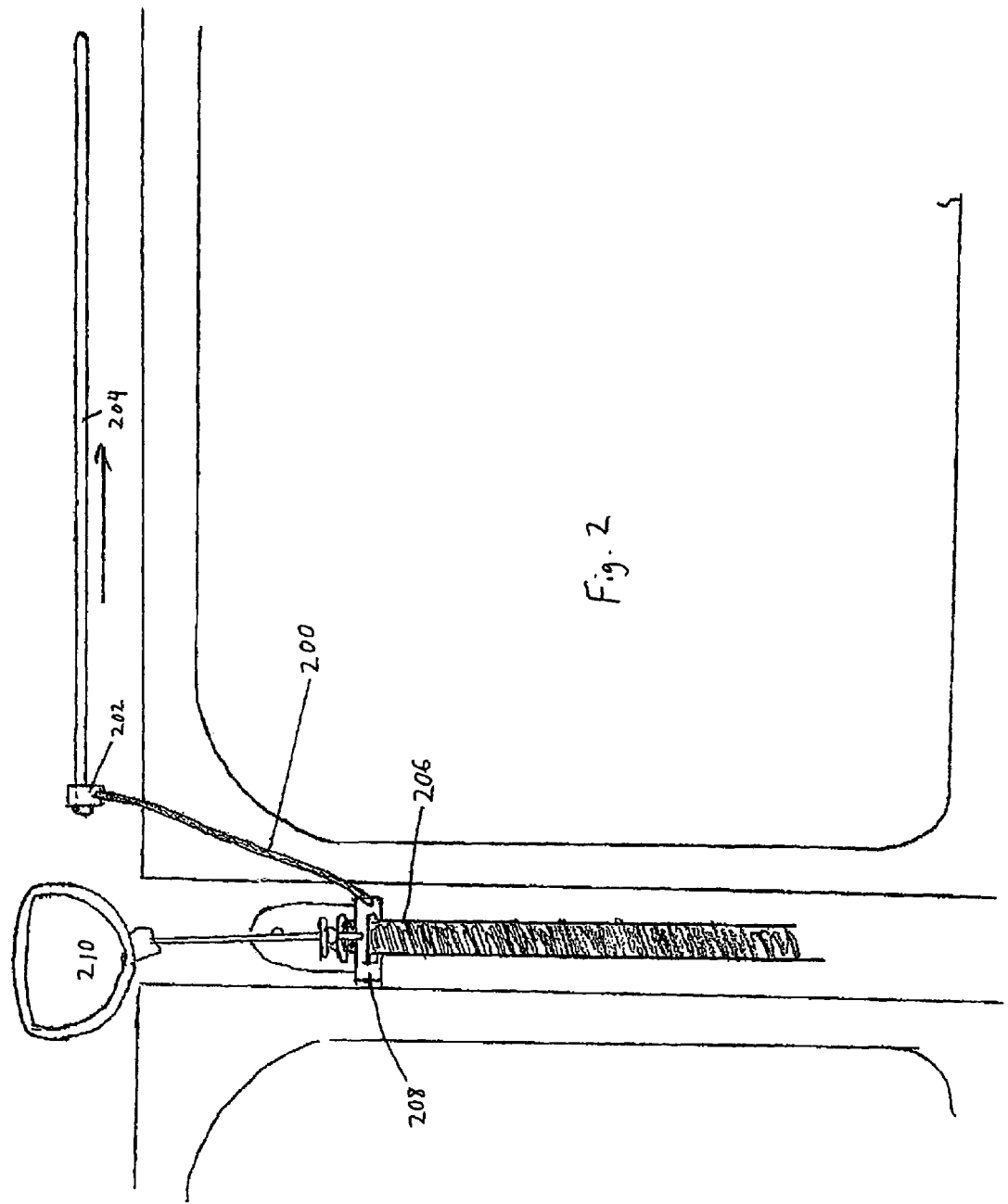
FIG. 2 is a diagram of a seatbelt access system having an electrically powered slide in accordance with one embodiment of the present invention.

FIG. 2 illustrates an alternative embodiment in which the pull cord 200 is attached to a slide 202 on an electrically powered track 204. When the electrically powered track 204 is activated (e.g., by a switch or other suitable device on the steering wheel or other suitable location), the slide 202 moves forward. As a result, a portion of the seatbelt 206 trapped in the seatbelt slide 208 moves forward and the driver or passenger can more easily access and operate the seatbelt 206. Once the seatbelt is grasped, the electrically powered track 204 can move the slide 202 back to its rearward position. The seatbelt 206, seatbelt slide 208 and retractor 210 operate in substantially the same manner as in the embodiment described in FIG. 1.

A rigid or semi-rigid bar 300 can replace the pull cord 100, as shown in FIG. 3. The bar 300 is preferably bent or curved approximately 90 degrees and pivotally connects to the frame 302 at one end and the seatbelt slide 304 at the other. Preferably, a clip 306 or other suitable securing device is provided to enable the bar 300 to be retained in the position illustrated so that it does not interfere with entering and exiting the vehicle; however, seatbelt access systems are not required to provide such a securing device or can secure the bar 300 in any other suitable manner (e.g., having a high coefficient of friction or other mechanical impediment to pivoting at one or both ends of the bar 300).

To operate the seatbelt access system of FIG. 3, a driver or passenger reaches up to grasp the bar 300. Preferably, the bar 300 is released from the clip 306, and the driver pulls the bar 300 such that the bar 300 pivots around the point at which the bar 300 attaches to the frame 302. As a result, the seatbelt slide 304 is pulled forward, enabling the driver easier access to the seatbelt as described above. Once the driver has accessed the seatbelt, the bar 300 can be returned to its initial position and re-secured by the clip 306.

Figure 4B:
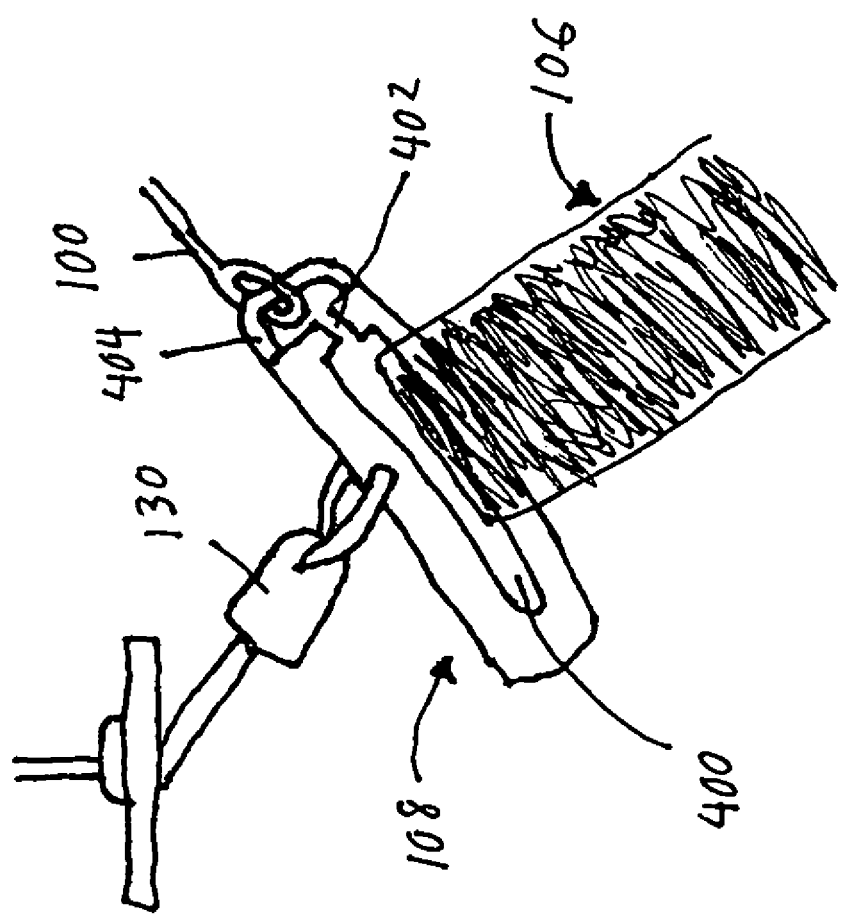
FIG. 4B is a diagram of the seatbelt slide of FIG. 1 wherein the seatbelt slide has been pulled forward.

FIGS. 4A and 4B show the seatbelt slide 108 of FIG. 1 in greater detail. In FIG. 4A, the seatbelt slide 108 is in a resting position, and in FIG. 4B, the seatbelt slide 108 is pulled to a forward position. The seatbelt slide 108 is preferably made from nylon to reduce friction between the seatbelt and the seatbelt slide 108; however, the seatbelt slide 108 can be made from any suitable material or materials and/or can include roller bearings or other friction reducing devices. The seatbelt slide 108 is preferably substantially rectangular shaped; however the seatbelt slide 108 can be any suitable shape. An interior cavity 400 is configured to substantially enclose a seatbelt while allowing the seatbelt to slide through the cavity 400, and one end of the seatbelt slide 108 preferably includes an access slot 402 through which the seatbelt can be passed during installation.

Once the seatbelt 106 is disposed within the cavity 400 through the slot 402, a sealing connector 404 is positioned to prevent the seatbelt from substantially passing through the slot 402 again. The sealing connector 404 is preferably a bent rod, a ring or link, or a ring or link segment pivotally attached to the seatbelt slide 108 and provides a location for the pull cord 100 to attach to the seatbelt slide 108; however, the sealing connector 404 have any suitable form and can be attached to the seatbelt slide 108 in any suitable manner. Further, the pull cord 100 can attach to the seatbelt slide 108 at any suitable location, including locations other than the sealing connector 404.

Figure 5:
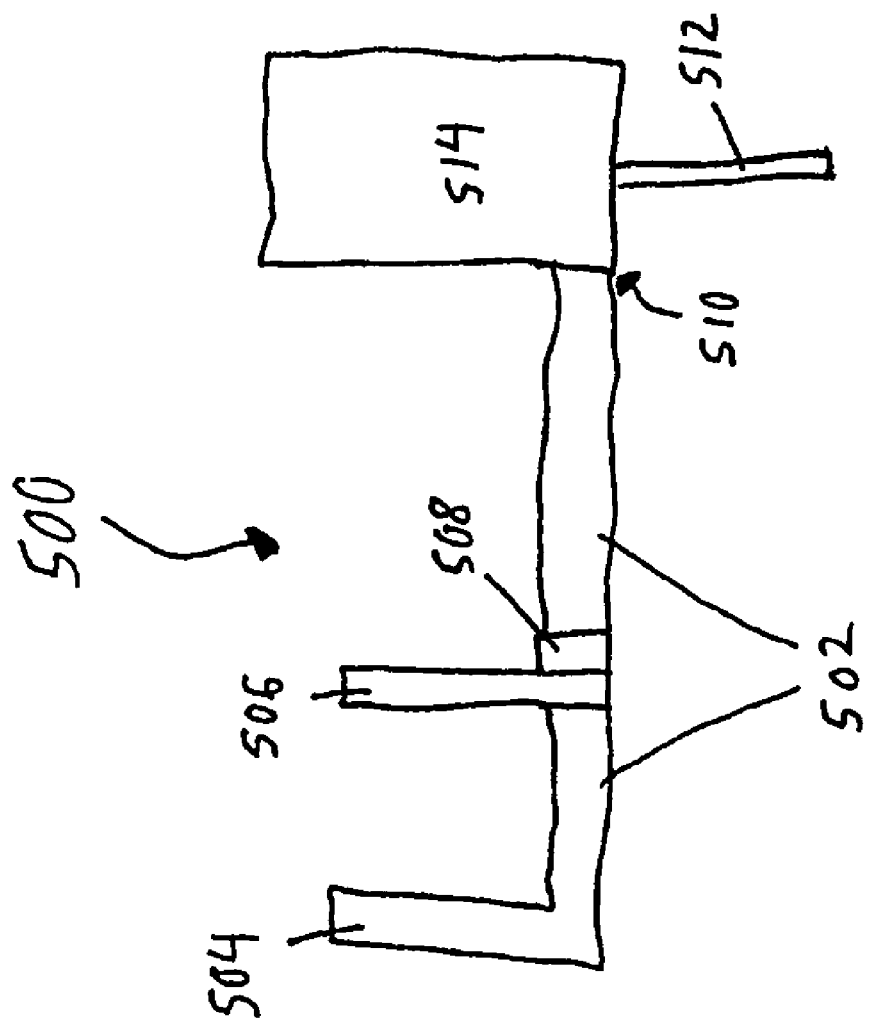
FIG. 5 is a diagram of a clamping unit in accordance with one embodiment of the present invention.
Figure 6:
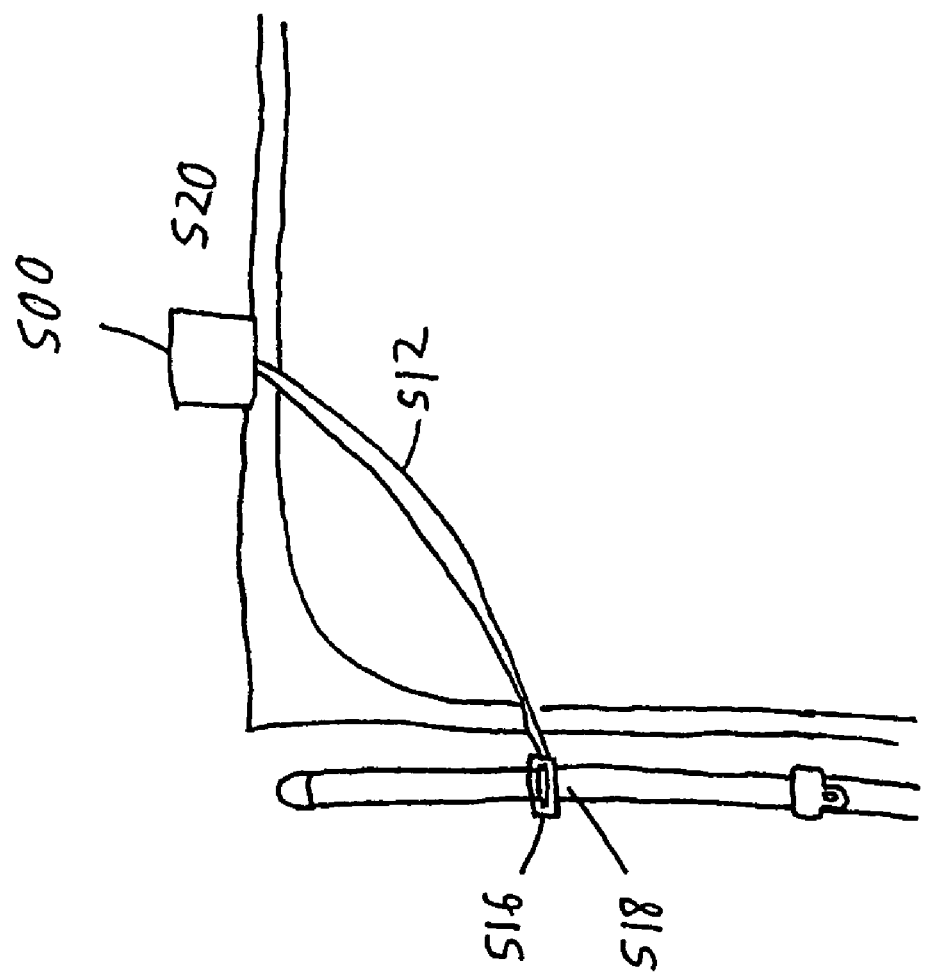
FIG. 6 is a diagram of a seatbelt access system capable of installation after a vehicle is manufactured in accordance with one embodiment of the present invention.

Preferably, a seatbelt access system is installed during manufacture of a vehicle; however, a seatbelt access system can be installed after manufacture of the vehicle. Such installation can be performed by a professional automotive technician or the seatbelt access system can be provided in a kit for installation by the vehicle owner or any other suitable party. FIGS. 5-6 show a seatbelt access system that can be installed by any suitable party after a vehicle's manufacture in accordance with one embodiment of the present invention.

The attachment of the pull cord to the care from over the door can be readily accomplished by a metallic terminal on the end of the cord securely held by a sheet metal screw into the internal metal of the door frame; however, the pull cord can be attached in any suitable manner.

FIG. 5 shows a side view of a clamping unit 500 that can be attached to the frame of the car when the door is open such that the door can still close while the clamping unit 500 is attached. The clamping unit 500 has a base 502 attached to an exterior protruding member 504 and an interior protruding member 506. Preferably, the interior protruding member 506 is movable along the base 502 and the exterior protruding member 504 is fixed with respect to the base 502. As a result, when the exterior protruding member 504 is positioned next to a surface of the vehicle frame, the interior protruding member 506 can be positioned such that the two members pinch or clamp the clamping unit 500 to the frame. Preferably, a locking mechanism 508 is also provided. The locking mechanism 508 can releasably prevent the interior protruding member 504 from moving once the clamping unit 500 is clamped to the frame. The locking mechanism 508 is preferably a nut; however, the locking mechanism can be any suitable device or structure.

The clamping unit 500 also includes an activator attachment location 510, at which an activator 512 (e.g., a pull cord, a rigid or semi-rigid bar, etc.) attaches to the clamping unit 500. Preferably, a retractor 514 couples the activator 512 to the activator attachment location 510; however, the activator 512 can attach to the activator attachment location 510 directly, through a motor or in any other suitable manner. It should be noted that the clamping unit 500 can be any suitable device for affixing the activator 512 to the vehicle frame and that the clamping unit 500 may attach to the vehicle frame in any suitable manner other than, or in addition to, by clamping, including, but not limited to, welding, screwing, nailing, gluing, velcroing, and affixing by one or more magnets.

As shown in FIG. 6, once the clamping unit 500 is attached to the vehicle frame 520, the activator 512 is connected to a seatbelt slide 516. Thus, when the activator 512 is activated (e.g., a pull cord is grasped and pulled in a downward and/or forward direction), a portion of the seatbelt 518 is pulled forward to a more readily accessible location.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention is claimed as follows:

1. A seatbelt access system comprising:
   a seatbelt;
   a seatbelt slide, wherein said seatbelt slide substantially encloses a portion of said seatbelt; and
   a seatbelt slide positioning system operable to move said seatbelt slide to a forward position from a resting position, the seatbelt slide positioning system including:
      a seatbelt slide retractor, wherein the seatbelt slide is coupled to the seatbelt slide retractor by a retractor cord, the retractor cord passing through a retractor cord guide affixed to an anchor attached to a vehicle frame, wherein the seatbelt slide retractor is operable to move the seatbelt slide from the forward position to the resting position by reducing the amount of the retractor cord that is exposed, wherein said seatbelt slide positioning system includes a pull cord.

2. The seatbelt access system of claim 1, wherein the pull cord is operably coupled to said seatbelt slide.

3. The seatbelt access system of claim 2, wherein the pull cord is also operably coupled to the vehicle frame.

4. The seatbelt access system of claim 2, wherein the pull cord is also operably coupled to an electronic motor.

5. The seatbelt access system of claim 2, wherein the pull cord is also operably coupled to an electrically powered track.

6. A seatbelt access system comprising:
   a seatbelt;
   a seatbelt slide, wherein said seatbelt slide substantially encloses a portion of said seatbelt; and
   a seatbelt slide positioning system operable to move said seatbelt slide to a forward position from a resting position, the seatbelt slide positioning system including:
      a seatbelt slide retractor, wherein the seatbelt slide is coupled to the seatbelt slide retractor by a retractor cord, the retractor cord passing through a retractor cord guide affixed to an anchor attached to a vehicle frame, wherein the seatbelt slide retractor is operable to move the seatbelt slide from the forward position to the resting position by reducing the amount of the retractor cord that is exposed wherein said seatbelt slide positioning system includes a motor operable to move said seatbelt slide substantially forward and an activation device operable to activate the motor.

7. The seatbelt access system of claim 6, wherein the activation device is selected from the group consisting of a button, a switch, a dial, a slide, a voice recognition device, an audio device and a video device.

8. The seatbelt access system of claim 6, wherein the motor is also operable to move said seatbelt slide substantially rearward.

* * * * *